United States Patent [19]
Okamura et al.

[11] 4,304,374
[45] Dec. 8, 1981

[54] TAPE CASSETTE

[75] Inventors: Masatoshi Okamura; Shigemasa Shoji; Haruo Shiba, all of Saku, Japan

[73] Assignee: TDK Electronics Co., Ltd., Tokyo, Japan

[21] Appl. No.: 62,107

[22] Filed: Jul. 30, 1979

[30] Foreign Application Priority Data

Jul. 29, 1978 [JP] Japan ............................. 53-104481[U]

[51] Int. Cl.³ ........................ G03B 1/04; G11B 15/32
[52] U.S. Cl. .................................................. 242/199
[58] Field of Search .................... 242/194, 197–200, 242/189; 226/195, 198; 360/96, 132

[56] References Cited

U.S. PATENT DOCUMENTS

| | | | |
|---|---|---|---|
| 3,198,450 | 8/1965 | Seiden | 242/199 |
| 3,642,225 | 2/1972 | Kakichi et al. | 242/189 |
| 3,672,603 | 6/1972 | Swain | 242/194 |
| 3,797,779 | 3/1974 | Esashi et al. | 242/199 |

*Primary Examiner*—Leonard D. Christian
*Attorney, Agent, or Firm*—Oblon, Fisher, Spivak, McClelland & Maier

[57] ABSTRACT

A tape pad for a tape cassette for continuously contacting a magnetic tape under pressure in a casing wherein the tape pad has a fitting hollow in which a supporting member non-rotatably mounted on the casing is inserted to support the tape pad.

4 Claims, 10 Drawing Figures

TAPE CASSETTE

BACKGROUND OF THE INVENTION

The present invention relates to a tape pad for a tape cassette such as a video cassette.

FIG. 1 shows one embodiment of the conventional video tape cassettes.

As shown in FIG. 1, in the conventional video tape cassette, reels (4), (5) which wind a magnetic tape (3) to run it, are set in a casing made of an upper half case (1) and a lower half case (2) and a tape pad (6) is placed in the passage of the magnetic tape (3) between the reels (4), (5) and the magnetic tape (3) is pushed by the tape pad (6) between the tape contacting surface (6a) of the tape pad (6) and a guide pole (7) so as to maintain the stability of the magnetic tape (3) in its running. A guide pole (8) is utilized and tape pad (6) has the structure shown in FIG. 2 wherein a spring plate (6b) such as a resilient plate made of polyethyleneterephthalate, and the tape contacting surface (6a) formed with graphite or polyethyleneterephthalate at one end of the spring plate (6b) and a double sided binding tape (6c) is bound on the other end of the spring plate. The double sided binding tape (6c) is bound on a bed plate (9) formed in the lower half case (2) to assemble the tape pad (6) in the half cases (1), (2).

In such structure, the adhesive force of the double sided binding tape (6c) to the bed plate (9) is not high enough or is deteriorated by binding problems or its aging, and accordingly, the tape pad (6) is disadvantageously peeled off from the bed plate (9).

As shown in FIG. 1, the guide poles (7), (8) and the bed plate (9) are placed around the tape pad (6) to provide a narrow free space. The assembling operation of the tape pad (6) is not easy and its operation efficiency is not high and moreover, slippage of the bound surface is caused, disadvantageously.

SUMMARY OF THE INVENTION

It is an object of the present invention to overcome the disadvantages found in the conventional video tape cassettes and to provide a tape cassette having high reliability which can be prepared by assembly of a tape pad with high processability without any failure of peeling off the tape pad after assembly.

The foregoing and other objects of the present invention have been attained by providing a tape pad for tape cassette for continuously contacting with a magnetic tape under pressure in a casing wherein the tape pad has a fitting hollow in which a supporting member mounted on the casing is non-rotatably inserted to support the tape pad.

DETAILED DESCRIPTION OF THE PREFERRED EMBODIMENTS

Figure 1:
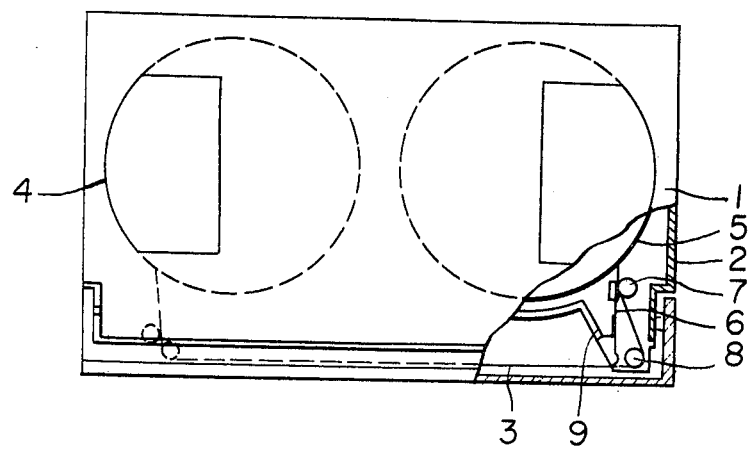
FIG. 1 is a partially sectional view of a conventional video tape cassette.
Figure 2:
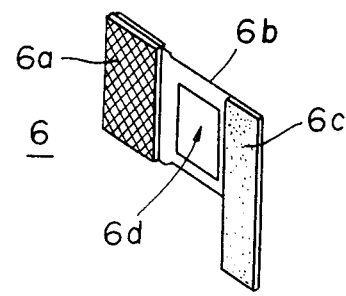
FIG. 2 is a schematic view of a tape pad used in the conventional video cassette.

Referring to the drawings, one embodiment of the present invention will be illustrated.

Figure 3:
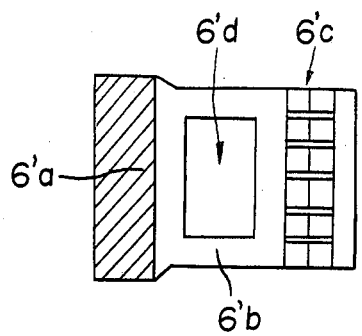
FIG. 3 is a front view of a tape pad used in the tape cassette of the present invention.
Figure 4:
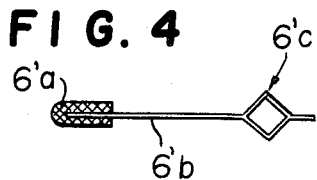
FIG. 4 is a plane view of the tape pad.

FIG. 3 is a front view of a tape pad assembled in the tape cassette of the present invention and FIG. 4 is a plane view thereof. As shown in FIGS. 3 and 4, the tape pad (6') has the structure wherein the tape contacting surface (6'a) is formed at one end of the spring plate (6'b) and a fitting hollow (6'c) is formed at the other end along the side line. In this embodiment, the fitting hollow (6'c) is formed by alternatively bending cut parts of the spring plates (6'b) to different sides to form the pair of convex parts. The sectional view of the hollow is substantially rectangular and the structure of the fitting hollow (6'c) can be modified as desired. For example, one end of the spring plate (6'b) is bent in a cylindrical shape or a rectangular shape along the side line to form the fitting hollow (6'c).

When two plied spring plates (6'b) are used, they can be bent to form the pair of convex parts and their last ends can be bound if desired. The other ends of the plied spring plates can be bound with a molded plastic to form the tape contacting surface.

When one spring plate (6'b) is used, one end is bent to form the fitting hollow. The last end can be bound on the opposite surface of the spring plate (6'b) if desired. The size of the fitting hollow is determined to allow it to fit over supporting member (10).

Figure 5:
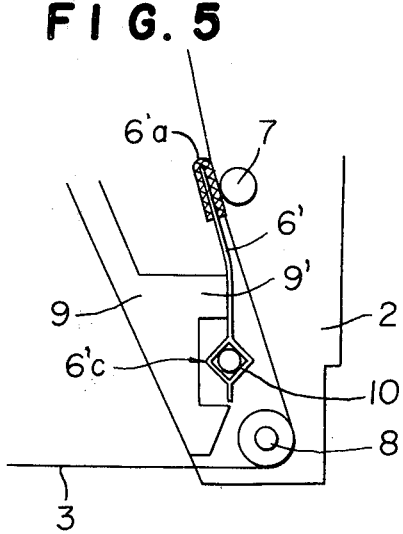
FIG. 5 is a partially enlarged sectional view of a video tape cassette of the present invention.

FIG. 5 is a partially enlarged sectional view of the video tape cassette of the present invention.

As shown in FIG. 5, in the tape cassette of the present invention, the supporting part (10) such as a round rod is mounted on the inner surface of the lower half case (2) near the bed (9) formed on the inner surface of the lower half case (2). The fitting hollow (6'c) of the tape pad (6') shown in FIGS. 3 and 4 is fitted from the top of the supporting member (10) whereby the tape pad (6') is assembled in the casing (1), (2).

A projection (9') of the bed (9) is to prevent the turning or rotation of the tape pad (6') around the supporting member (10).

In the tape cassette of the present invention, assembly of the tape pad (6') can be accomplished only by fitting the fitting hollow (6'c) on the supporting member (10). Therefore, the processability during assembly is remarkably high and assembly can be easily carried out by an automatic assembling machine. The slippage of the tape pad (6') is not caused and the positioning of the tape pad (6') can be precisely given. Moreover, a trouble of the peeling of the tape pad can be prevented after the assembling.

The configuration of the fitting (6'c) hollow of the tape pad (6') can be varied as shown in FIGS. 6 to 10.

The spring plate (6'b) can be a steel plate as well as a resin plate such as a polyester plate. The tape contacting surface (6'a) can be made of a graphite-polytetrafluoroethylene and can be bonded on the edge of the spring plate with a binder if desired, a double sided binding tape.

Figure 6:
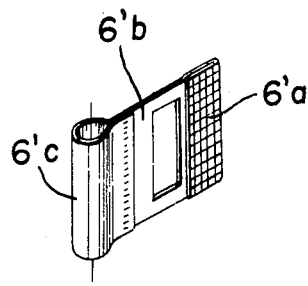
FIGS. 6 to 10 are respectively schematic views of embodiments of a fitting hollow of a tape pad.

In FIG. 6, one end of the polyester spring plate (6'b) is bonded to the pole ring (6'c) by heat-bonding and the other end of the polyester spring plate is bonded with a double sided binding tape to a tape contact surface made of a graphite-polytetrafluoroethylene (6'a).

Figure 7:
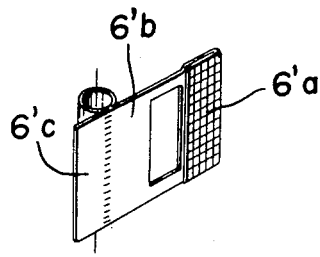

In FIG. 7, the pole ring (6'c) is heat-bonded on the polyester spring plate (6'b).

Figure 8:
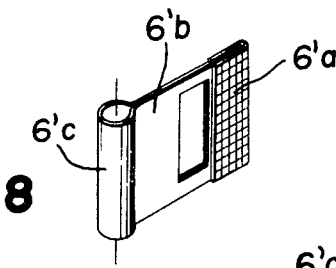

In FIG. 8, the polyester spring plate (6'b) is bent to form the pole ring (6'c) and both ends of the plates (6'b) are bonded to the tape contact surface (6'a).

Figure 9:
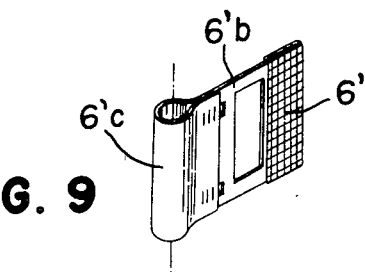

In FIG. 9, one end of the spring plate is bent and fitted to form the pole ring (6'c).

Figure 10:
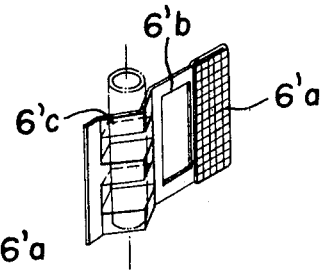

In FIG. 10, one end of the spring plate is cut and alternatively bent to form the fitting hollow (6'c) in the embodiment shown in FIG. 5.

In the tape cassette of the present invention, the tape pad for continuously contacting with the magnetic tape under pressure is placed in the passage of the magnetic tape in the casing, the fitting hollow is then formed in the tape pad and is non-rotatably fitted on the supporting member mounted on the inner surface of the casing so as to support the tape pad. Therefore, the operation efficiency for assembly of the tape pad is remarkably improved, the tape pad can be assembled by an automatic assembling machine, the slippage or the peeling of the tape pad in the assembling operation or after the assembling operation can be completely prevented and the reliability of the tape pad is remarkably improved.

What is claimed as new and desired to be secured by Letters Patent of the United States is:

1. A tape pad assembly for a tape cassette which contacts with a magnetic tape under pressure in the passage of the magnetic tape in a casing of the tape cassette comprising:
    a tape pad member having a fitting hollow portion formed therein;
    a supporting member mounted on the inner surface of said casing upon which said fitting hollow portion is mounted for non-rotatably supporting said tape pad member such that said tape pad continuously contacts said magnetic tape; and
    a projection member formed on an inner surface portion of said casing for engaging said tape pad between said supporting member and an end portion of said tape pad to prevent rotation of said tape pad about said supporting member.

2. The tape pad assembly according to claim 1, said fitting hollow portion comprising:
    a plurality of bent plied spring plates which form a pair of convex parts in opposite directions.

3. The tape pad assembly according to claim 2, said spring plates are of a rectangular sectional shape.

4. The tape pad assembly according to claim 1, said fitting hollow portion comprising: a spring plate bent at one end.

* * * * *